US007076650B1

(12) United States Patent
Sonnenberg

(10) Patent No.: US 7,076,650 B1
(45) Date of Patent: Jul. 11, 2006

(54) SYSTEM AND METHOD FOR SELECTIVE COMMUNICATION SCANNING AT A FIREWALL AND A NETWORK NODE

(75) Inventor: Glen Sonnenberg, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 09/471,630

(22) Filed: Dec. 24, 1999

(51) Int. Cl.
    *G06F 11/30* (2006.01)
(52) U.S. Cl. ..................... 713/151; 713/152; 713/153
(58) Field of Classification Search ........ 713/200–201, 713/151–153; 709/104–105, 220, 223–229
    See application file for complete search history.

(56) References Cited

U.S. PATENT DOCUMENTS

| 5,623,600 | A | * | 4/1997 | Ji et al. ..................... 713/201 |
| 5,884,046 | A | * | 3/1999 | Antonov ..................... 709/238 |
| 5,889,943 | A | * | 3/1999 | Ji et al. ..................... 713/201 |
| 5,960,170 | A | * | 9/1999 | Chen et al. .................. 714/38 |
| 6,003,083 | A | * | 12/1999 | Davies et al. ............... 709/226 |
| 6,173,311 | B1 | * | 1/2001 | Hassett et al. .............. 709/202 |
| 6,345,299 | B1 | * | 2/2002 | Segal ........................ 709/229 |
| 6,374,300 | B1 | * | 4/2002 | Masters ..................... 709/229 |
| 6,415,323 | B1 | * | 7/2002 | McCanne et al. ........... 709/225 |
| 6,732,279 | B1 | * | 5/2004 | Hoffman .................... 713/201 |

OTHER PUBLICATIONS

Unattributed White Paper by Network Associates, Inc., "Adaptive Proxy Firewalls, The Next Generation Firewall Architecture: Eliminating the Speed-vs-Security Compromise," 10 pages, undated, downloaded from http://www.nai.com/asp_set/buy_try/try/whitepapers.asp on Dec. 21, 1999.

(Continued)

*Primary Examiner*—Thomas R. Peeso
(74) *Attorney, Agent, or Firm*—Zilka-Kotab, PC; Christopher J. Hamaty

(57) ABSTRACT

A method and apparatus are provided for cooperatively and dynamically sharing a proxy's burden of scanning communications for target content. A network of computer nodes is connected to a firewall through which pass communications with entities external to the network. The firewall includes one or more proxies to facilitate network users' connections with the external entities. The firewall and one or more of the nodes include software modules for scanning one or more types (e.g., FTP, HTTP, SMTP) of communications for particular information or types of data (e.g., computer viruses, ActiveX components, pornography, text). A node having a software module for scanning a communication identifies its scanning capabilities to the firewall. The node may also suggest a class or set of communications that it may scan, which class or set may be defined by its operating parameters or attributes of communications received at the firewall for the node. The firewall negotiates with the node then specifies rules or criteria for determining which communications and under which circumstances the node may scan a communication instead of the firewall. When a communication is received at the firewall and is passed to the proxy, the proxy applies the specified rules to determine which of the proxy and the node should scan the communication. In this manner a substantial amount of communication scanning may be offloaded to individual computer nodes, thereby enhancing or avoiding degradation of the firewall's performance. The division of responsibility between the proxy and any node may be dynamically modified or re-negotiated at virtually any time according to any desired criteria or operating parameters.

11 Claims, 6 Drawing Sheets

OTHER PUBLICATIONS

Unattributed White Paper by Network Associates, Inc., "The Active Firewall: The End of the Passive Firewall Era, A Dynamic New Model for Integrated Active Response Firewall Security," 16 pages, undated, downloaded on Dec. 21, 1999 from http://www.nai.com/asp_set/buy_try/try/whitepapers.asp.

* cited by examiner

SYSTEM AND METHOD FOR SELECTIVE COMMUNICATION SCANNING AT A FIREWALL AND A NETWORK NODE

BACKGROUND

This invention relates to the field of computer systems. More particularly, a system and methods are provided for intelligently shifting or sharing the load of proxy duties in a networked computing environment.

In today's electronic society, organizations often separate their internal computer networks (e.g., Local Area Networks or LANs) from outside computing systems and networks (e.g., the Internet) by positioning a firewall between their internal network and the external systems and networks. Firewalls typically incorporate hardware and software elements to prevent an outside user from gaining unfettered access to internal assets and may also be configured to limit the activities of internal users when communicating with an external entity through the firewall. For example, a firewall may mask or alter outgoing communications to prevent an outsider from learning details of the internal computing environment. Further, a firewall may be configured to apply a set of rules (e.g., established by the organization's system or network administrator) to allow or disallow particular communications from passing through the firewall from one side to the other. Thus, firewalls are positioned astride what may be the only connection (or only full-time connection) between the internal network and external systems.

A firewall may incorporate one or more proxies or proxy modules to handle particular functions or particular types of traffic received by the firewall. In particular, proxies are often employed on a firewall to accept connections from internal users and establish connections with external entities on behalf of the users without revealing details or information concerning the users or the internal network and computer nodes.

In addition to representing a user to the outside world, a proxy may be configured to perform various other functions to enhance the security of the internal network and/or prevent unwanted or undesirable communications from being received. The more functionality or duties assigned to a proxy, however, the more overhead that is added to its operation. As a result the performance of a proxy and, by extension, the firewall, may be degraded.

A firewall may have several proxies installed and enabled for a variety of purposes. A first proxy, for example, may be enabled for FTP (File Transfer Protocol) traffic passing through the firewall to scan transferred files for viruses.

Another proxy may be configured to examine all HTTP (HyperText Transport Protocol) traffic through the firewall in order to allow certain actions or commands (e.g., web surfing) and disallow others (e.g., disallow downloading of ActiveX controls).

When a message, communication or packet reflecting one of these protocols is received by the firewall, it is forwarded to the appropriate proxy. The proxy must then parse and examine the communication to determine if it is allowed to continue. The proxy thus applies a set of rules, criteria or parameters for each communication it receives. This may have a significant effect on the firewall's throughput. If, for example, a proxy scans every communication (e.g., for viruses or unwanted data such as pornography), communications may be slowed considerably.

Thus, what is needed is a system and method of applying the security features offered by a proxy but with little or no degradation to the operation of an organization's firewall and internal network. In particular, a firewall's overall performance may be enhanced by off-loading some of a proxy's duties (e.g., scanning for viruses or other content) for certain communications destined for trusted network nodes.

SUMMARY

In one embodiment of the invention a system and methods are provided for scanning a communication that is received at a firewall on behalf of a destination node on one or the other of the firewall and the destination node. In particular, a set of rules, criteria or parameters may be established to determine when a communication is to be scanned for target content (e.g., computer viruses, programming objects, content of a particular type) on a destination node instead of the firewall. Overall performance of the firewall may thus be enhanced by off-loading some of its communication scanning responsibilities to a trusted host or node that is connected to the firewall.

In this embodiment a firewall protects a network of user computer nodes and has one or more proxy modules installed. A proxy may be configured to establish connections or handle communications to external entities on behalf of internal network nodes. Different proxies may be configured to handle different types of communications (e.g., FTP, HTTP, SMTP). In this embodiment a proxy is also configured to scan the communications it handles for target content such as computer viruses, programming objects (e.g., ActiveX controls, Java applets), or general content such as pornography, advertisements, etc.

The firewall thus includes one or more scanning modules (e.g., a virus scanner) to be invoked by a proxy to scan a communication. The proxy also includes a set of rules or criteria to determine when a communication is to be scanned on the firewall and when it is to be scanned by a destination node of the communication.

In one embodiment of the invention a base or default set of rules and criteria may be specified by a system or network administrator. These rules may determine which network nodes may scan some or all of their communications, when (e.g., time of day, level of firewall or proxy activity) the proxy may leave a communication to be scanned by its destination node, a minimum security configuration a node may have to in order to be able to scan communications, etc.

In another embodiment of the invention an individual network node interacts with the firewall or a proxy to negotiate or arrange a set of proxy rules or criteria for allowing the node to scan all or a subset of communications for which it is the destination. In one embodiment of the invention a node may identify its scanning capabilities (e.g., the scanning modules it has installed and enabled) and offer an initial set of criteria or parameters under which it is presently configured to scan communications. The firewall or proxy may then compare the offered criteria against its default or minimal rules to determine which communications and under which circumstances the node will actually be allowed to scan a communication. The node then applies the specified criteria or rules.

When a communication is received at the firewall and directed to the proxy, it applies its rules and criteria to determine how to handle the communication. After ensuring that it (the firewall or proxy) is capable of scanning the communication (i.e., a suitable scanning module is installed), the proxy determines if the destination node of the communication is enabled or allowed to accept responsibility for scanning any communications. If so, then the proxy determines if the communication and circumstances meet the rules and criteria under which the communication is to be passed to the node for scanning. If so, the communication is forwarded to and scanned by the destination node. Otherwise, if the destination node is not participating in a cooperative arrangement with the proxy (e.g., the scanning module(s) on the node, if any, are not configured to cooperate with the proxy) or the communication or circumstances dictate that the proxy must scan the communication then the communication is only forwarded after it is scanned and, if necessary, cleaned.

DETAILED DESCRIPTION

Figure 1A:
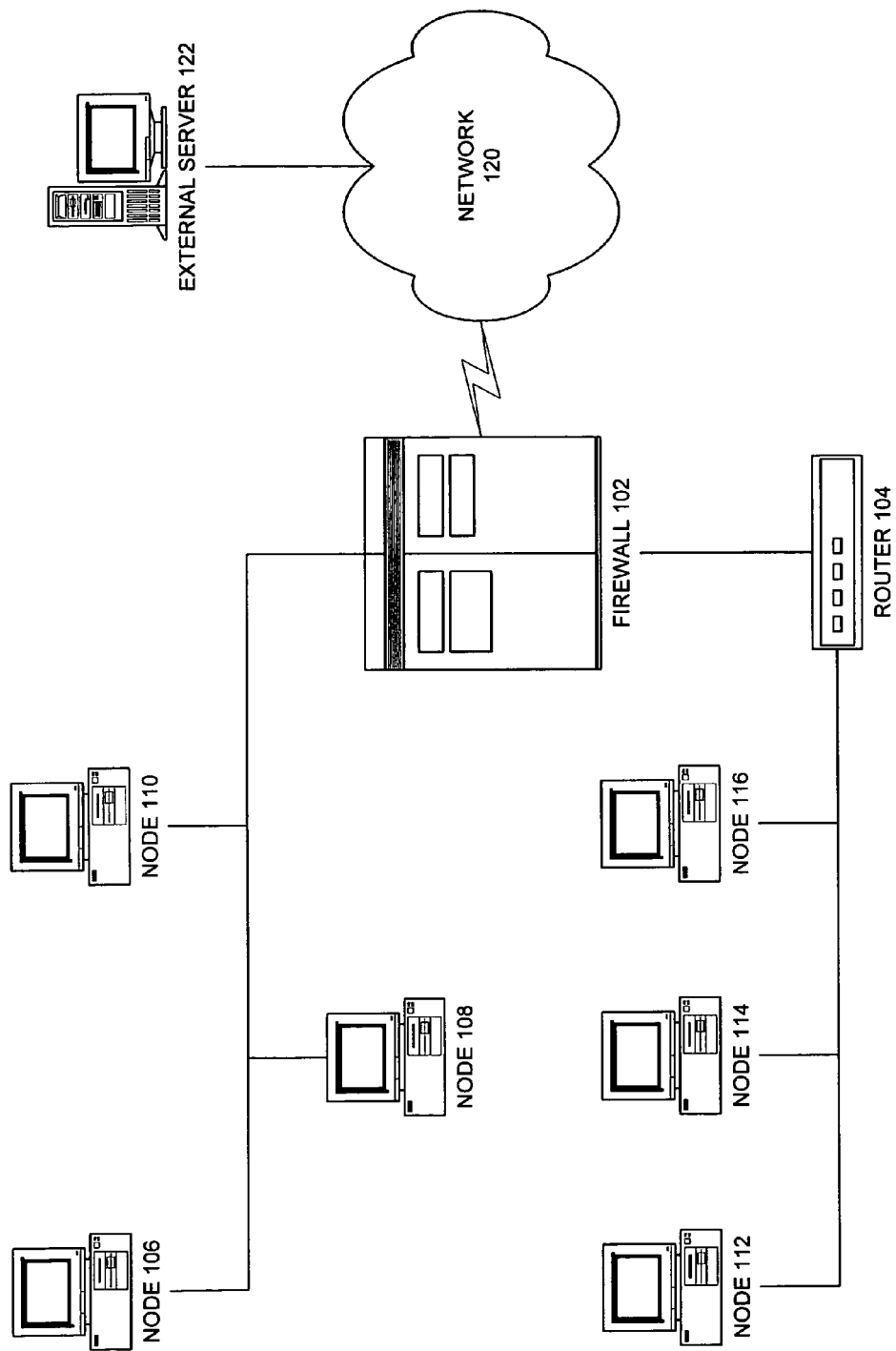
FIGS. 1A–1B are block diagrams depicting one system for sharing responsibility for scanning communications between a firewall and one or more network nodes connected to the firewall, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

In one embodiment of the invention a system and method are provided for sharing responsibility for scanning communications between a firewall and individual computer nodes served by the firewall. In a system employing one embodiment of the invention a firewall operates astride a communication link between an organization's network (e.g., a LAN) and external networks and computer systems (e.g., the Internet). The firewall includes one or more proxy modules to handle certain types of communications passing through the firewall. Each proxy is configured to handle communications of a particular type (e.g., a specific network or communication protocol) and decide whether to allow or disallow a communication based on predetermined criteria. One or more proxies are also configured to scan a communication for viruses, specified programming objects (e.g., ActiveX controls), other content (e.g., pornographic data) that is desirable or undesirable, etc.

In one embodiment of the invention a method is provided to allow individual computer nodes in the network to take responsibility for scanning a communication directed to it from the other side of the firewall. In particular, certain communications (e.g., distinguished by type, size, destination, time) may be scanned at the firewall (e.g., by a proxy) while others are scanned at the destination nodes. Thus, for a given communication this scheme offloads a dynamically determinable amount of time-intensive tasks from the firewall to the destination node of the communication and avoids degrading the firewall's performance. Illustratively, individual nodes and the firewall may "negotiate" a partitioning of scanning responsibility between them, so that one of them may scan communications that meet certain criteria while the other scans the remainder of the communications. Advantageously, even while configured to scan communications, individual computer nodes are still available for operation by users.

Figure 1B:
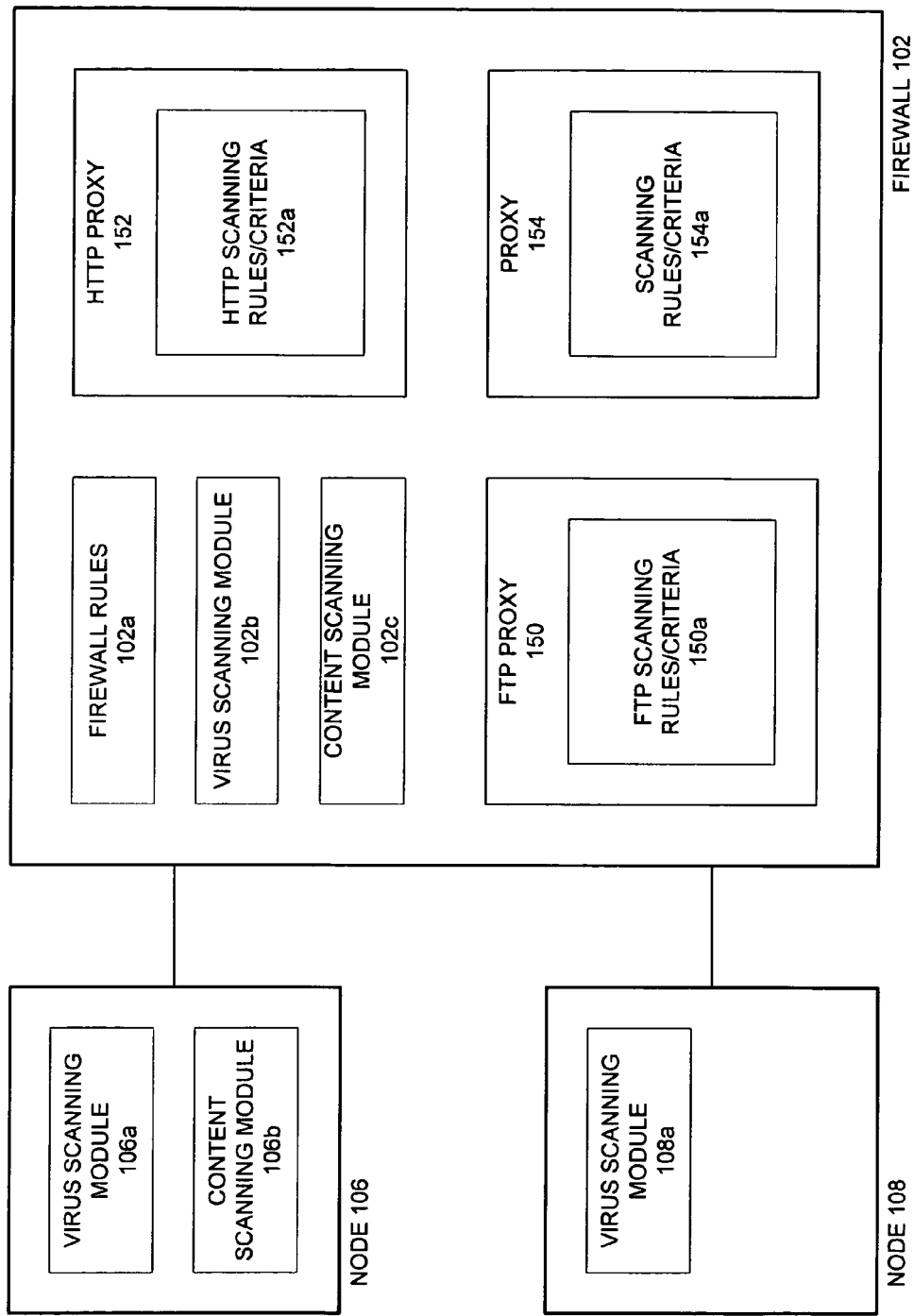

A System for Selectively and Cooperatively Scanning Communications at a Firewall and a Computer Node FIGS. 1A–1B depict a system for sharing responsibility, between a firewall and individual computer nodes connected to the firewall, for scanning communications received from outside entities according to one embodiment of the invention. In particular, FIGS. 1A–1B demonstrate one system in which a communication is selectively scanned (e.g., for viruses and/or other desired or undesired content) at either a server (e.g., firewall) or an individual computer node that is the destination of the communication. The dynamic nature of the division of responsibility between a firewall and individual computer nodes provides much greater flexibility than systems in which all scanning is done on one or the other. The server or firewall that performs just some of the scanning is able to devote more resources to other tasks than if all communications were scanned there and yet is still able to ensure proper treatment of the communications to promote the security of the computer nodes.

In FIG. 1A, firewall 102 is a server or other computer system configured to segregate an organization's network from external entities such as network 120 (e.g., the Internet) and server 122. In particular, firewall 102 prevents external entities and users from viewing the configuration or other details of the organization network by acting as a screen for communications that pass from one side of the firewall to the other.

Firewall 102 may thus accept connections from external users and make cooperating connections to desired entities within the network without the external user becoming aware of how the internal connection was established. Similarly, firewall 102 may accept connections from internal users and, possibly with the help of one or more proxies (described below), initiate corresponding connections to external entities using its own indicia or identity (e.g., IP (Internet Protocol) address) rather than an identity or address of an internal user.

The organization's network in FIG. 1A is represented by router 104 and computer nodes 106–116. One skilled in the art will appreciate that a network protected by a firewall may exhibit any of a wide range of physical and logical structures and components. FIG. 1A thus depicts just one possible configuration of computing devices and communication links suitable for implementing an embodiment of the invention and may be modified quite extensively without exceeding the scope of the invention.

FIG. 1B is a block diagram demonstrating software modules that may be installed and configured on firewall 102 and one or more cooperating network nodes in a present embodiment of the invention. In particular, it may be seen that firewall 102 and selected network nodes are configured with one or more modules or sets of executable instructions for scanning a communication.

In this embodiment firewall 102 includes proxies relating to different types of communications (e.g., differentiated by protocol) that the firewall will handle. Thus, in the illustrated embodiment firewall 102 includes FTP (File Transfer Protocol) proxy 150, HTTP (HyperText Transport Protocol) 152 and an additional proxy 154. Proxy 154 may represent another communication protocol (e.g., SMTP (Simple Mail Transport Protocol)) or may be a "plug" proxy configured to receive and/or establish connections for a particular application or communication service (e.g., AOL) operating on a node within the organization's network. In other embodiments of the invention various other proxies may be installed on firewall 102.

In the illustrated embodiment of the invention firewall 102 examines communications (e.g., individual or sequences of packets, frames, etc.) received at the firewall and, based on firewall rules 102a, forwards to each installed and enabled proxy those communications that match its type and that are permitted to transit the firewall. Illustratively, firewall rules 102a comprise a set of guidelines or instructions the firewall applies to determine whether to accept, reject or otherwise manipulate a particular communication. In particular, the firewall rules may specify what to do with each type of communication it receives. Thus, all FTP requests and responses concerning file accesses may be provided to FTP proxy 150 while HTTP proxy 152 receives HTTP communications.

As explained further below, each proxy may include a set of rules or criteria concerning whether and how the proxy should manipulate a communication. A proxy may, for example, be configured to allow or disallow communications through the firewall that relate to certain commands or actions (e.g., downloading a large image file, uploading a file from an internal node to an external entity). A proxy's rules may also specify whether the proxy should scan a communication that matches a specified type or that exhibits a particular attribute.

Thus, firewall 102 includes one or more modules for scanning a communication at the instigation of a proxy or on the initiation of the firewall itself. For example, FTP proxy 150 may, depending upon its rules/criteria 150a, invoke virus scanning module 102b to scan a communication for viruses. Other scanning modules, such as content scanning module 102c may be configured to scan a communication for other particular content or information (e.g., programming objects such as ActiveX controls or Java applets, unwanted or undesired information such as pornography or other explicit data).

One or more computer nodes of the organization's network—such as nodes 106–108—are configured for user operation but also include one or more scanning modules that cooperate with scanning modules and/or proxies on firewall 102 to scan a communication. Thus, node 106 includes virus scanning module 106a and content scanning module 106b, while node 108 includes virus scanning module 108a. Illustratively, a node having a scanning module installed will interact or "negotiate" with the firewall and/or one or more proxies to determine when a communication destined for the node will be scanned by the firewall and when a communication will be passed to, and scanned by, the node. In one embodiment of the invention the firewall negotiates with a node on behalf of one or more proxies and then pass a configuration to the proxy or proxies.

In this embodiment, the firewall considers the configuration and parameters of a node's scanning module and determines, from its own rules and criteria and/or those of a proxy, when the node is to be allowed to scan its own communications and for what type of content. The firewall then specifies operating parameters or criteria to the node, which may be updated or changed at regular intervals, when the node reboots, when a new scanning module is installed, or at other times.

The following section describes various methods by which an individual node within the organization's network may cooperate with firewall 102 to scan communications directed to the node in a system such as that described in FIGS. 1A–1B. One skilled in the art will appreciate that the configuration of the illustrated system may be modified without exceeding the scope of the invention.

One Method by Which a Firewall and a Computer Node Selectively and Cooperatively Scan Communications In one embodiment of the invention communication scanning modules on a user's computer node cooperate with a firewall to divide communication-scanning duties between the firewall and the node. Thus, with reference to FIG. 1B, in this method of the invention one subset of FTP communications received at firewall 102 from external entities and destined for node 106 is scanned for viruses at firewall 102 by FTP proxy 150 using virus scanning module 102b. Another subset of the received FTP communications is forwarded by the firewall to node 106, without being scanned for viruses by proxy 150. Communications in the second subset are then scanned by virus scanning module 106a on node 106.

As one of ordinary skill in the art will recognize, sharing the communication scanning duties between a firewall and individual computer nodes preserves firewall resources (e.g., processor time, communication bandwidth) for other operations and may thus increase its efficiency and overall performance. In particular, by dynamically modifying the division of responsibility between a node and the firewall, more scanning may be offloaded by the firewall when it is busy and reserved to the firewall when it is less busy. Thus, a node may contact the firewall, or vice versa, at regular or specified times or upon occurrence of particular events in order to select different criteria or rules for determining where a communication is to be scanned.

Various criteria, rules and attributes of the communications to be scanned may be used to partition the communication scanning duties between a firewall and a computer node. Illustratively, the criteria, rules and attributes are stored by the proxy (e.g., as rules/criteria 150a for FTP proxy 150 in FIG. 1B) and/or the firewall (e.g., in firewall rules 102a). In one embodiment of the invention, responsibility for different types (e.g., FTP, HTTP, SMTP) of communications is, as described above, divided among different proxies in the firewall. Within a particular type of communication, however, attributes and criteria such as the following may be used to decide where a communication is scanned: size of the communication or portion of the communication to be scanned; whether the communication is encrypted; which version of a scanning module is installed on a node or the firewall; the source or destination of the communication (e.g., which node in the network, as determined by an IP address); the time at which the communication is received at the firewall; the degree of utilization of the firewall; etc. One skilled in the art will appreciate that this is merely a listing of sample criteria and communication attributes that may be examined. In alternative embodiments of the invention other criteria and attributes may be used.

In one embodiment of the invention a method of partitioning communication scanning responsibilities begins by installing the necessary proxies on the firewall (if not already resident) and installing the desired scanning modules on the firewall and individual computer nodes. Illustratively, different scanning modules may be configured to scan different types of communications and/or scan for different types of information/data (e.g., viruses, Java applets, ActiveX controls, text strings). Further, different nodes may receive different scanning modules or even no modules (e.g., if the node is not robust or powerful enough or is not trusted).

Thus, in this embodiment of the invention individual computer nodes are configured with selected scanning modules in addition to whatever other applications or utilities (e.g., web browser, word processor) may be installed and operated by node users. In addition, a scanning module may be configured with parameters, modes of operation or other options selected by the user or a person installing the module. Thus, in an embodiment of the invention in which a virus scanner such as VirusScan by McAfee® is installed as a scanning module on one or more nodes, each node's copy of the virus scanner may be configured differently (e.g., to scan different types (e.g., *.doc, *.exe) of files). Other illustrative scanning modules that may be installed on a computer node and a firewall include WebShield by Network Associates, Inc. (to scan for Java applets and ActiveX controls) and Net Nanny by Net Nanny Software International, Inc. (to block indecent or undesired data). Virtually any type of scanning module may be installed regardless of the type of content they scan for (e.g., digital signatures, watermarks or other hidden characteristics within images, etc.).

After the firewall, its proxies and a computer node that is to participate in the cooperative scanning of communications receive the necessary scanning modules, a negotiation or agreement process is performed between the node and the firewall. Before this process, however, a set of default or preferred rules may be set on the firewall and/or firewall proxies.

In particular, an administrator of the firewall may specify how much or how little scanning may be performed on individual nodes and/or the firewall. The firewall may receive from the administrator a senior or "global" set of parameters to apply to all proxies and all communication scanning. The firewall may also receive (e.g., from the administrator or a user during a negotiation process) parameters to be enforced or applied for a particular proxy or for a particular type of communication.

For example, an administrator may specify that all or a definable subset of communications (e.g., files considered more valuable or vulnerable) are to be scanned on the firewall—at all times or just in certain instances (e.g., if a node has an old or obsolete scanning module or scanning module data file). The administrator may specify that certain nodes or users are permitted to bear more scanning responsibility than others. The administrator may specify that the firewall is to offload more scanning during relatively busy periods (e.g., during the workday) than slower periods (e.g., at night). In general, the administrator may specify default or minimal configurations to be enforced against all nodes or just for specified nodes and/or scanning modules. Thus, despite how a user may configure its scanning module—to scan both document and executable files for viruses, for example—the administrator may override the user's configuration. In this example an administrator may want to prevent nodes from scanning executable files, in which case the firewall will be responsible for scanning these types of files. One of ordinary skill in the art will appreciate the large number of configurable parameters that may be part of various scanning modules (e.g., file type, file size, time, type of content to scan for, identity of a node or user, level of trust). A firewall or proxy administrator may draw upon these and other parameters in determining how flexible the cooperative method of scanning communications is to be.

After a node and the firewall have had their scanning modules and rule sets configured, the node may then contact the firewall, or a particular proxy, and initiate a negotiation to determine how much scanning will be done on the node. Alternatively, the firewall may initiate the negotiation or instruct the node to contact the firewall at a particular time or after a particular event (e.g., when usage of the node by a user falls below a threshold level).

Illustratively, to begin a negotiation process a node establishes a connection to the firewall using a specified firewall port. In this embodiment individual network nodes negotiate with the firewall, which acts on behalf of its installed proxies. The firewall then passes an agreed-upon or specified configuration to the proxies after the negotiation. In an alternative embodiment, however, a node may be able to directly communicate with a proxy module to determine criteria or rules concerning when and where a file may be scanned.

In the presently described embodiment of the invention the connection is made secure through mutual authentication. Thus, a level of trust is established between the node and the firewall before dividing scanning duties. In one embodiment the node provides a digital certificate when it first contacts the firewall. The firewall authenticates the node and then returns its own certificate, which is authenticated by the node. After the authentication process, the information exchanged between them may be encrypted.

After a secure, trusted link is established between the node and the firewall, the node may inform the firewall of its scanning capabilities. For example, node 106 of FIG. 1B may inform firewall 102 that it is capable of scanning for viruses (e.g., with virus scanning module 106a) and for other particular content (e.g., with content scanning module 106b).

After identifying its scanning capabilities, the node may propose or report its current scanning parameters. For example, node 106 may report the operating parameters selected by a user for virus scanning module 106a, or a default set of parameters associated with the module. In the presently described embodiment, where the firewall negotiates on behalf of individual proxies, the node may submit all of its scanning proposals (e.g., for different types of content using different scanning modules) at once. Therefore, the node may include a negotiation or management module to act on behalf of multiple scanning modules. As one alternative, each scanning module on the node may take turns providing details to the firewall or otherwise negotiate in a cooperative manner. This configuration may thus mirror the firewall, wherein the firewall or a management module therein negotiates on behalf of the individual proxies.

The firewall then compares the node's current or proposed operating parameters to its own rules, criteria or attributes and those of a proxy for which it is negotiating. For example, the firewall may consider the capability and parameters of virus scanning module 106a of node 106 on behalf of each of FTP proxy 150 and HTTP proxy 152 of FIG. 1B. Depending upon each proxy's rules or minimum configuration the firewall specifies a set of operating parameters to the node for each scanning module and/or for each proxy. The specified parameters may be identical to or have some range of similarity to the current parameters set on the node or scanning module.

Thus, the firewall may dictate on behalf of FTP proxy 150 that node 106 is to scan for viruses (i.e., with virus scanning module 106a) all FTP communications or transferred files that include documents but that the proxy will be responsible for scanning executable files. The firewall may further specify on behalf of HTTP proxy 152 that node 106 is to scan all HTTP communications or embedded objects that are greater than 5 MB in size.

The node then applies the specified parameters/criteria to communications received through the firewall, regardless of how a user may have configured virus scanning module 106a.

Figure 2:
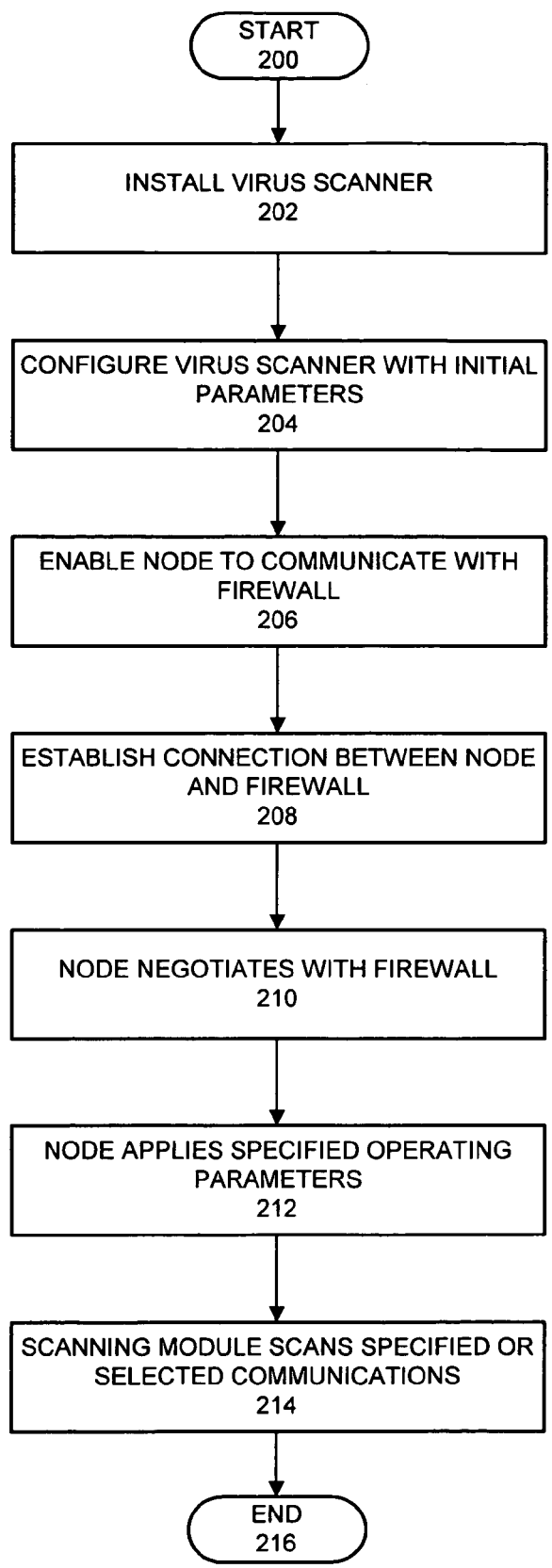
FIG. 2 is a flowchart illustrating one method of configuring a network node to cooperate with a firewall proxy to scan communications received at the firewall for the node in accordance with an embodiment of the invention.

FIG. 2 is a flowchart demonstrating one method of configuring a node to cooperate with a firewall and one or more firewall proxies to share responsibility for scanning communications in one embodiment of the invention. In this embodiment the node operates a virus scanning module to scan for various types of computer viruses. In other embodiments of the invention the node may be configured to scan communications for other types of content (e.g., indecent or scandalous material, particular programming objects such as ActiveX controls).

State 200 is a start state. Prior to or during state 200 the node is configured for operation by a user. Thus, word processing, database, web browsing and other applications and utilities may be installed and configured. In particular, in this embodiment of the invention proxies share their scanning duties with network nodes operated by users. If, by contrast, the proxy merely offloaded scanning of some communications to a dedicated computer system this would slow communications through a different bottleneck and still leave the dedicated system subject to congestion and overloading.

In state 202 the virus scanning module is installed if not already resident. One virus scanner that is particularly suitable for use in this embodiment is VirusScan by McAfee® Other virus scanning applications/utilities capable of cooperating with a proxy or remote scanning module (e.g., a proxy's scanning module on a firewall) are also suitable for use with an embodiment of the invention. In one embodiment of the invention suitable scanning modules are pre-configured to be able to communicate with a firewall or proxy in order to divide their communication scanning responsibilities.

In state 204 the virus scanning module is configured with initial operating parameters. The parameters may include such factors as types and/or sizes of messages, communications and other files to scan (e.g., attachments to electronic mail messages, Java applets, word processing documents, macros), when to scan, what to do if a virus is found, etc. Illustratively, these parameters may be selected by a user, a system or network administrator or may be default settings that are automatically applied when the module is installed.

In state 206 the node (e.g., the scanning module) is configured to facilitate interaction with the firewall and/or one or more proxies on the firewall (if not already so configured). Illustratively, in this embodiment of the invention the node employs a central or management module separate from the scanning modules to interact with the firewall on behalf of the scanning modules. Similarly, the firewall includes a similar module to interact with the node on behalf of one or more proxies. Each of these central modules is therefore responsible for determining operating parameters of its constituents.

Illustrative parameters configured on the management module to facilitate interaction with a proxy or firewall include one or more of: an address of the firewall (e.g., an IP or other network address), a port (of the firewall) to connect to in order to reach a particular proxy, a digital certificate or other means of authenticating itself or the node to the firewall, a method of encryption to be used while communicating with the firewall, etc. The module is also configured to indicate when to negotiate with the firewall. Exemplary options for this parameter include: upon rebooting of the node, upon user request, when a new scanning module is installed, configured or re-configured, or with regular frequency (in which case a time interval is specified).

In state 208 the node initiates a connection to the firewall or, in one alternative embodiment, a proxy operating on the firewall. Illustratively, the node and firewall exchange digital certificates or other means of authenticating each other. After they have been authenticated the connection may be secured via encryption, such as with some form of PKE (Public Key Encryption), SSL (Secure Sockets Layer), etc.

In state 210 the node negotiates with the firewall to determine how to apportion between them responsibility for scanning communications received by the proxy for the node. In particular, the node and firewall interact in order to determine what type(s) of content the node may scan for, and which communications it may scan.

Figure 4:
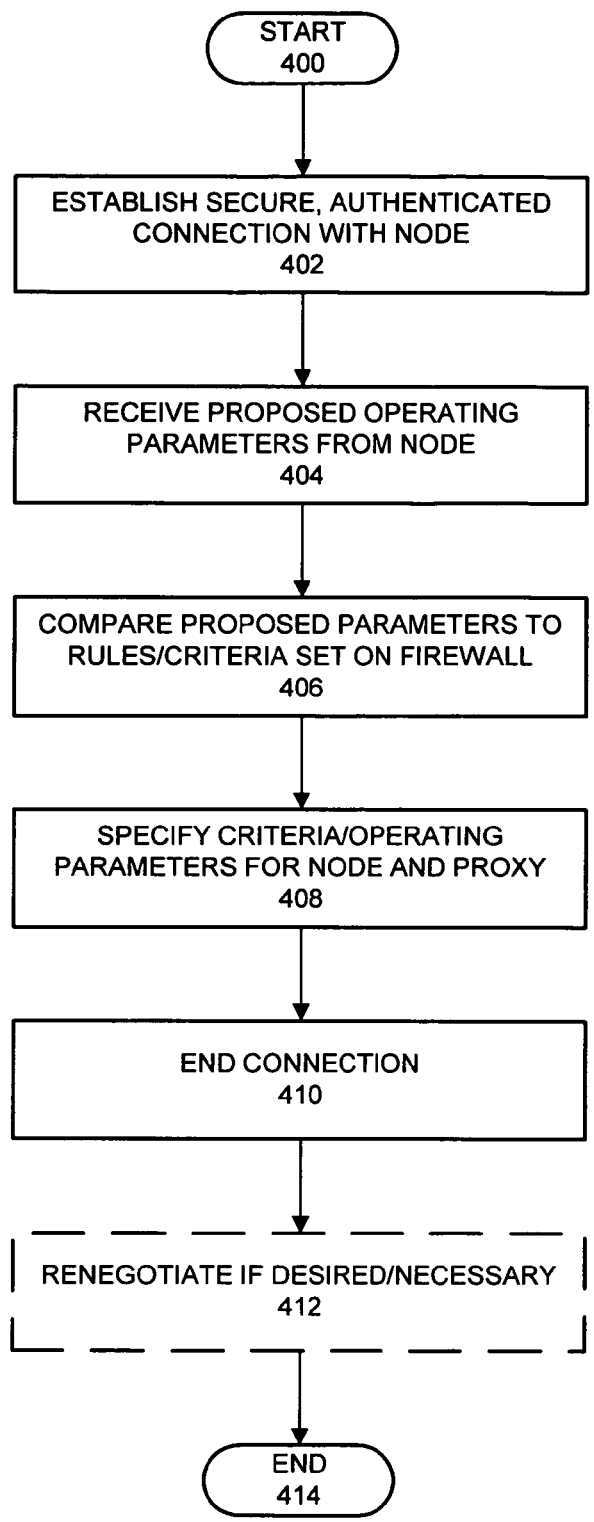
FIG. 4 is a flowchart demonstrating one method by which a computer node connected to a firewall may negotiate with the firewall or a firewall proxy to share responsibility for scanning communications received at the firewall for the node, in accordance with an embodiment of the present invention.

An illustrative method of negotiation is depicted in further detail in FIG. 4. In one embodiment of the invention, however, the node first proposes a set of operating parameters or criteria for determining when the node will scan a communication instead of the firewall. The firewall may then consult a set of rules or some default or minimal criteria to determine when the node is permitted to do its own scanning. In this embodiment of the invention the firewall retains the ultimate authority to enforce a particular division of responsibility, so that a network or system administrator may ensure a desired level of security or a uniform scheme for scanning communications.

In state 212 the node applies the set of operating parameters specified by the firewall. These parameters may complement or supersede the initial parameters established by a user or by default for a particular scanning module.

In state 214 the node receives a communication from an external entity (e.g., through the firewall) and determines, via the parameters/criteria specified by the firewall, whether it is to scan the communication. If so, the virus scanning module is invoked and searches the communication or an embedded file or object for viruses. If the communication does not meet its operating parameters, the node may assume that the communication was scanned and cleaned (if necessary) on the firewall.

One of ordinary skill in the art will appreciate that this is but one illustrative method of configuring a computer node to share communication scanning responsibility with a firewall or proxy in order to improve performance of the firewall. Within the scope of the present invention, the illustrated method may be modified to fit a particular operating environment or may be otherwise modified in various ways that will be apparent to one skilled in the art.

For example, the firewall or a proxy may tag or otherwise mark individual communications to be scanned by the node, in addition to or instead of using specified operating parameters. Thus, if the firewall becomes congested, a proxy may mark one or more communications to be scanned by the node even though the communications do not otherwise meet the criteria under which the node is to take action. Conversely, the firewall or a proxy may mark those communications that it has scanned, in which case the node then scans only unmarked communications. Illustratively, however, the proxy may store or retain some record or knowledge of the node's scanning capabilities so that it can be sure that it only relies on the node to scan communications that it is capable of scanning.

In one embodiment of the invention, for every communication received at the firewall from an external entity and passed to an internal node an event is logged concerning whether the firewall (e.g., by a proxy) scanned the communication or whether it was left for the destination node to scan. The firewall may then interrogate a node or, through some other means, determine whether a communication passed to the node without being scanned was actually scanned on the node. Similarly, the firewall's log may be used to ensure a node that a communication was scanned on the firewall.

Figure 3:
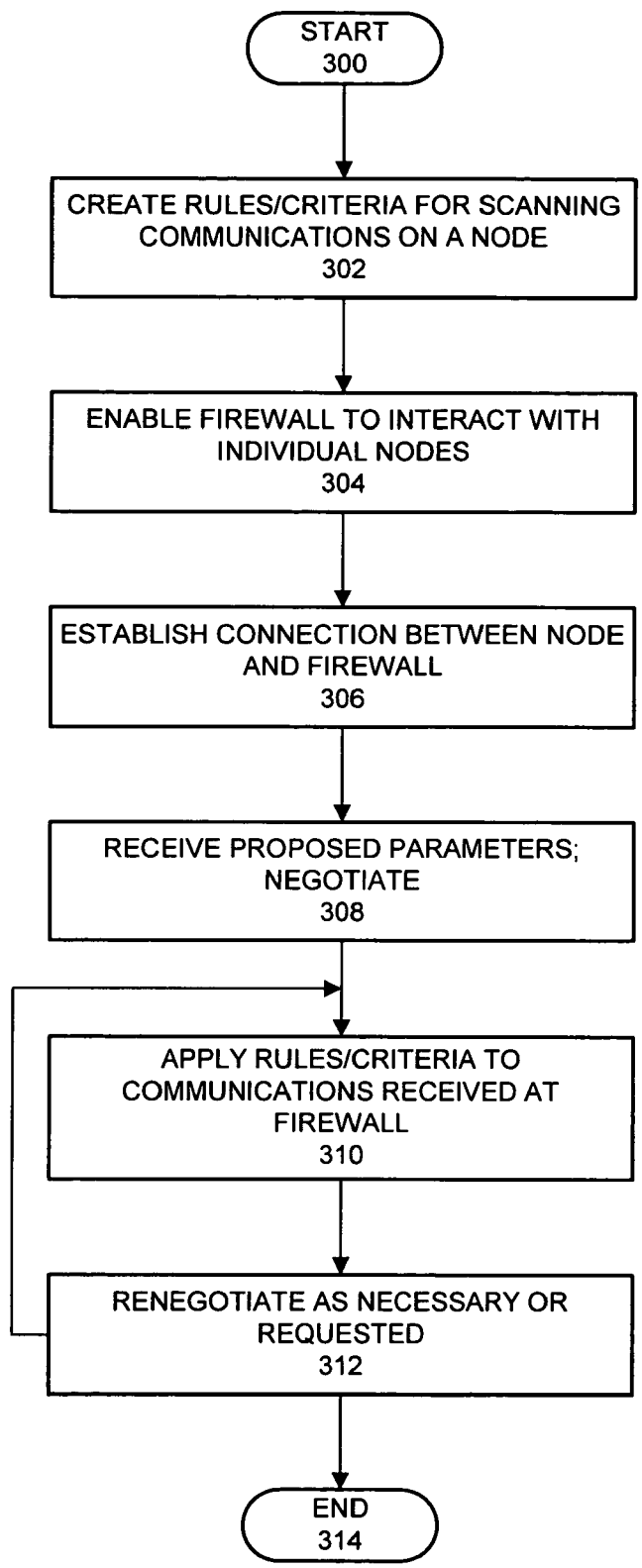
FIG. 3 is a flowchart demonstrating one method of configuring a firewall to selectively allow a network node to scan a communication rather than scanning the communication on the firewall, in accordance with an embodiment of the present invention.

FIG. 3 depicts one method by which a proxy on a firewall may be configured to share communication scanning responsibilities with one or more nodes of a network in a present embodiment of the invention. State 300 is a start state in which the proxy is installed on the firewall if not already resident.

In state 302 default rules/criteria are established specifying when network nodes (or when a particular node) may scan a communication received from an external entity. Individual nodes may be treated differently, perhaps according to the level of sophistication or trustworthiness of a user of the node, as may different communications. Thus, the rules and criteria are flexible and may be relatively complicated or simple depending upon the configuration selected by a network or system administrator. Factors such as the following may be considered and reflected in the rules/criteria: the type or version of a scanning module installed on the firewall or a node; the power (e.g., processor type or speed) of a node or the firewall; the amount of communication traffic received at the firewall; the amount of a particular type of communication traffic (e.g., FTP, HTTP) received at the firewall or at a particular node; minimum security configuration of a node; time of day; etc.

In state 304 the firewall or proxy is enabled to interact (e.g., negotiate) with individual nodes if not already capable. The firewall may, for example, be disabled from negotiating with nodes while a proxy is configured or re-configured. Or, if an administrator wishes to disable any sharing of the task of scanning communications, the firewall may be blocked from negotiating with nodes, in which case all communications are scanned on the firewall.

In state 306 the firewall receives or initiates a connection with a network node. Illustratively, individual nodes may initiate connections with the firewall at predetermined times or after certain events (e.g., system reboot). In addition, however, the firewall may be configured to initiate a connection to a particular node with which a proxy or the firewall needs to re-apportion the division of scanning responsibility. As described in conjunction with FIG. 3, in a present embodiment of the invention all interactions between a node and a firewall for the purpose of agreeing to share scanning chores are secured. Thus, each entity authenticates each other and their connection may be encrypted or otherwise protected.

In state 308 the firewall negotiates or interacts with the node to determine which entity will scan which types of communications under which circumstances. Illustratively, the node identifies its scanning capabilities (e.g., what types of scanning modules it has installed) and suggests an initial set of parameters (e.g., such as those presently set for each scanning module). Advantageously, however, the firewall makes the final decision as to what types of communications and under what types of circumstances the node may scan its own communications. In an alternative embodiment of the invention, however, one or more individual nodes (e.g., those of system administrators or other selected users) may be able to override one or more rules or criteria of the firewall or a particular proxy.

In state 310 a proxy applies its rules/criteria to communications it receives at the firewall. The proxy thus invokes a scanning module on the firewall to scan communications that it is responsible for (and then forwards them to the node) and passes the others directly to the node for scanning.

In state 312 the firewall and a node may connect and re-negotiate as desired or necessary. The node may receive a new scanning module, for example, in which case it must contact the firewall to determine when it may use the new module. Or, the firewall may receive a newer version of a scanning module in which case it may want to re-negotiate with one or more nodes to remove some scanning responsibility from nodes having an older or obsolete version. Yet further, in one embodiment of the invention the firewall may provide (e.g., download or "push") a new or updated scanning module to a node. For example, part of the negotiation process between a node and a firewall may involve a determination as to whether the firewall has a new, different or more recent version of a module or component of a module. The firewall may then require the node to receive and apply the new version.

One of ordinary skill in the art will appreciate that the preceding is but one illustrative method of configuring a firewall proxy to share communication scanning responsibility with a node in order to improve performance of the firewall. Within the scope of the present invention, the illustrated method may be modified to fit a particular operating environment or may be otherwise modified in various ways that will be apparent to one skilled in the art.

FIG. 4 demonstrates one method in which a node and a firewall may negotiate, according to one embodiment of the invention, to determine how to share responsibility for scanning communications received at the firewall for the node. State 400 is a start state in which each of the node, one or more scanning modules on the node, the firewall and one or more firewall proxies are configured to scan a communication.

In state 402 a trusted, secure connection is established between a node and the firewall. The connection may be initiated at the instigation of either entity. For example, the firewall or a proxy may broadcast instructions to multiple nodes to contact the firewall and negotiate or re-negotiate their share of communication scanning responsibilities. Individual nodes may then connect to the firewall according to some schedule or on a first-come, first-served basis.

In state 404 the firewall receives a proposed or initial set of scanning parameters or criteria from the node. Illustratively, these parameters may have been set for a scanning module on the node by a user or by default.

In state 406 the firewall compares the proposed parameters to its configured rules and criteria for scanning communications. These may be considered global parameters in that they apply to all communications transiting the firewall, not just those handled by a particular proxy. The firewall also compares the proposed parameters to the rules/criteria of any proxies that handle communications that would be affected by the proposed scanning scheme. As a result, the firewall can then determine what types of communications and in what circumstances (e.g., time of day, level of firewall congestion) the node is both able to and permitted to scan its own communications.

In state 408 the firewall informs the node and one or more proxies of the types of communications that the node may scan. The node and the proxies then apply those parameters, which may supersede the node's initial parameters. In one embodiment of the invention the node stores its initial parameters as usual and, although it implements them, it may not store the parameters specified by the proxy. In this embodiment, each time the node reboots or restarts the scanning module, the node again interacts with the firewall to determine when it is to scan a communication. In one alternative embodiment, however, the parameters specified during one negotiation are saved by the node and continually enforced (even if the node reboots or restarts its scanning module) until the firewall re-negotiates with it or someone reconfigures the scanning module parameters in an attempt to modify the operating parameters.

In state 410 the connection between the node and the firewall ends. In state 412 the node and the firewall may re-negotiate at a predetermined time or after a particular event.

One of ordinary skill in the art will appreciate that the procedure described in conjunction with FIG. 4 is but one illustrative method in which a firewall may negotiate with a network node to share communication scanning responsibility in order to improve performance of the firewall. Within the scope of the present invention, the illustrated method may be modified to fit a particular operating environment or may be otherwise modified in various ways that will be apparent to one skilled in the art.

Figure 5:
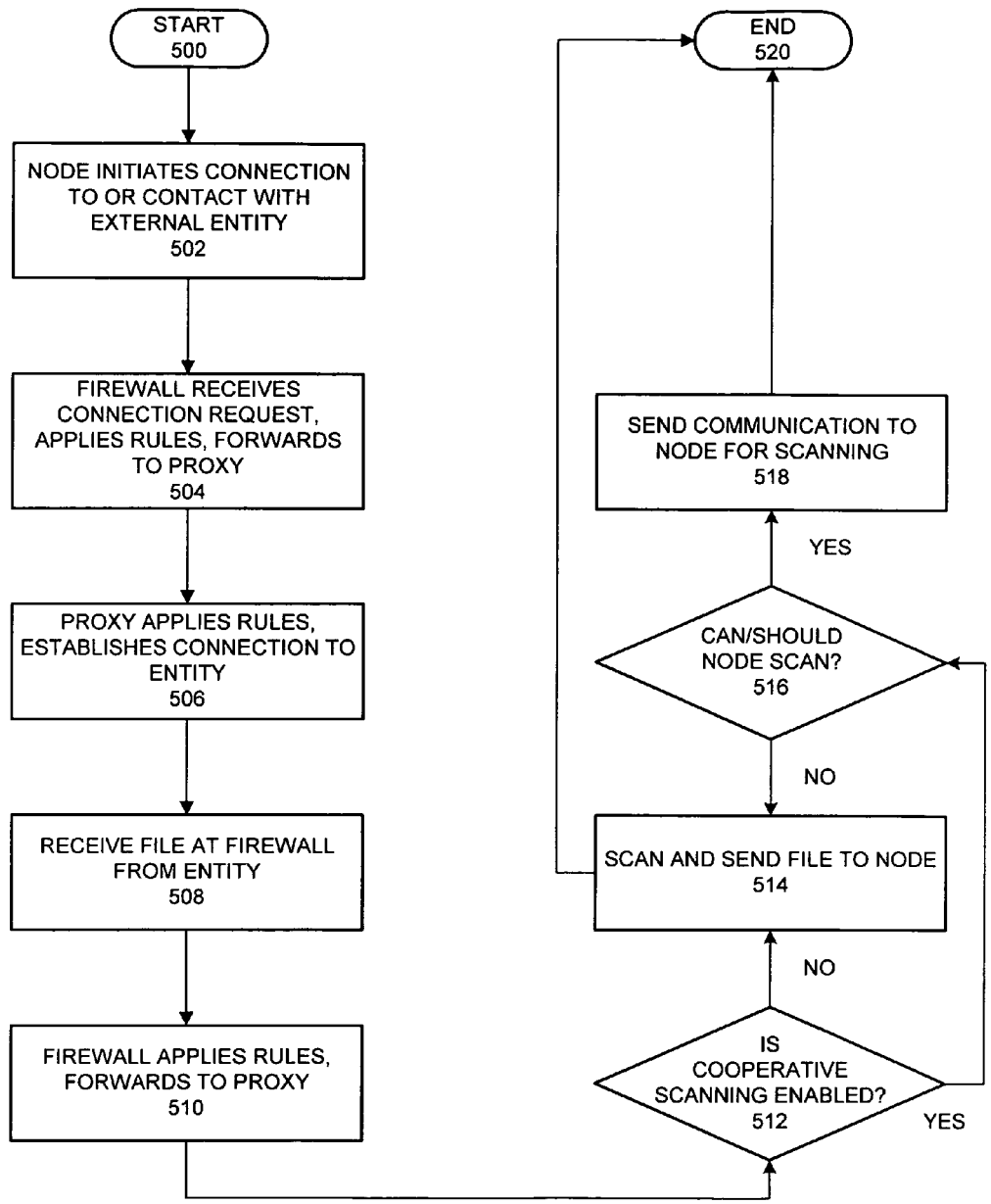
FIG. 5 is a flowchart illustrating one method of operating a firewall to selectively delegate to a computer node responsibility for scanning a communication destined for the node in accordance with an embodiment of the invention.

FIG. 5 demonstrates one method in which a firewall proxy and a computer node cooperate in one embodiment of the invention to scan communications received at the firewall for the node from an external entity. State 500 is a start state in which the node, the firewall and the proxy are configured for cooperative operation and negotiate to divide responsibility for scanning communications.

In state 502 a user's computer node in a network protected by the firewall initiates a connection to an external entity beyond the firewall. In this illustrative procedure the node initiates an FTP connection in order to download a file from an external server.

In state 504 the firewall receives the connection request. The firewall then applies its rules to the request to determine if it is allowed and how to handle the request. Illustratively, the firewall may identify the node that issued the request and determine from its rules whether it is permitted to contact external entities. If the firewall has no rule against allowing the connection to proceed, it forwards the request to the appropriate (i.e., FTP) proxy.

In state 506 the FTP proxy examines its own rules to ensure that the desired FTP connection is permissible. If its rules allow, the proxy establishes a connection to the external entity on behalf of the requesting node, without revealing details of the node to the external entity.

In state 508 a communication containing the requested file is received at the firewall from the external entity. In state 510 the firewall again checks its rules, this time for incoming communications, to determine if the communication is allowable. For example, the firewall may determine that the file is allowable because it was requested by an internal node (e.g., rather then being pushed by the external entity).

In state 510 the firewall forwards the communication to the FTP proxy because it is an FTP communication.

In state 512 the FTP proxy applies its rules. Illustratively, the proxy first determines whether it or the firewall can scan the communication. In this embodiment a scanning module (e.g., a virus scanner) has already been installed and configured on the firewall, so this determination is settled affirmatively. If the proxy had no means of scanning the communication, it might either drop the communication or pass it to the node, depending on its rules/criteria established by an administrator. The proxy then determines whether it has a cooperative arrangement with the node to share responsibility for scanning FTP communications. If it does, the illustrated procedure advances to state 516.

Otherwise, if the proxy has not off-loaded its responsibility for scanning this communication to the node, in state 514 it scans the file with a scanning module and, if the communication (e.g., the requested file) passes the scan (e.g., contains no detectable computer viruses) it is forwarded to the node, after which the procedure ends at state 520.

In state 516 the proxy determines whether the node can and should scan the communication. In particular, in an embodiment in which incoming files are to be scanned for viruses, the proxy determines whether the node is capable of scanning for viruses. Illustratively, during a negotiation process with the node the proxy noted or was informed of the node's scanning capabilities. If the node is incapable of scanning the communication then the proxy will do so (e.g., in state 514) and then forward the communication to the node if its rules or operating parameters allow (and the communication has been cleaned of undesired content); the procedure then ends at state 520.

If the node is capable of scanning the communication (e.g., it has a competent virus scanner), the proxy then determines whether its rules/criteria allow for the node, rather than the proxy, to scan the communication. Illustratively, the proxy may examine various attributes of the communication in addition to its type (i.e., FTP), such as: size, identity of the destination/requesting node, a level of trust or suspicion associated with the external entity, whether the file is encrypted or otherwise altered, etc. If the proxy determines that the node is both capable of and responsible for scanning the communication, the procedure continues at state 518. Otherwise the proxy, in state 514, scans the communication itself and, if cleared, sends it to the node and exits in state 520.

In state 518, the requesting/destination node receives the communication and scans it. Illustratively, the node recognizes that it must scan the communication because the communication matches its operating parameters received from the proxy. Alternatively, the node may be configured to scan (or not scan) each communication it receives from the proxy that is marked (or not marked) in some way (e.g., a flag or particular value may be placed in a field of the communication).

After state 518 the illustrated procedure ends at state 520.

One of ordinary skill in the art will appreciate that the preceding is but one illustrative method in which a proxy on a firewall may negotiate with a network node to share communication scanning responsibility in order to improve performance of the firewall. Within the scope of the present invention, the illustrated method may be modified to fit a particular operating environment or may be otherwise modified in various ways that will be apparent to one skilled in the art.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of scanning a communication received at a firewall for target content, wherein the communication is directed to one of a set of computer nodes connected to the firewall, comprising:

maintaining on the firewall a scanning module configured to scan communications received at the firewall;

maintaining a set of criteria for determining when one of said communications may be scanned at a computer node connected to the firewall instead of at the firewall;

partitioning responsibility for scanning said communications between said firewall and a first computer node connected to the firewall;

receiving a first communication at the firewall, wherein said first communication is intended for said first computer node;

identifying one or more attributes of said first communication;

determining from said criteria and said attributes whether to scan said first communication for target content on the firewall;

determining from said criteria and said attributes whether said first computer node is configured to scan said first communication for said target content; and forwarding said first communication to said first computer node;

wherein said first computer node receives and scans the communication for said target content;

wherein said partitioning comprises:

receiving scanning capabilities of a first computer node connected to the firewall;

consulting a set of scanning requirements specified by an operator of the firewall; and specifying a set of criteria to identify when a communication may be scanned for target content by said first computer node.

2. The method of claim 1, further comprising:

receiving a second communication at the firewall, wherein said second communication is intended for a second computer node;

identifying one or more attributes of said second communication;

determining from said criteria and said attributes of said second communication whether said second computer node is permitted to scan said second communication for predetermined content;

scanning said second communication at the firewall for said predetermined content; and forwarding said second communication to said second computer node;

wherein said second computer node receives but does not scan said second communication for said predetermined content.

3. The method of claim 1, wherein said partitioning further comprises receiving a set of proposed criteria from said first computer node.

4. A method of protecting a network of computer nodes from computer viruses, wherein the network of computer nodes is connected to a firewall comprising:

maintaining a set of scanning rules for determining when a communication received at a firewall is to be scanned on the firewall and when said communication may be scanned by the destination node of said communication;

receiving a first communication at the firewall, wherein said first communication is intended for a first computer node connected to the firewall;

determining whether a first virus scanner is enabled on the firewall;

determining whether a second virus scanner is enabled on said first computer node;

identifying a first set of attributes of said first communication;

determining from said first set of attributes and said rules that said first communication is to be scanned on said first computer node;

forwarding said first communication to said first computer node without scanning said first communication for computer viruses, wherein said first computer node scans said first communication for computer viruses using said second virus scanner;

receiving a second communication at the firewall;

identifying a second set of attributes of said second communication;

determining from said second set of attributes and said rules that the firewall is responsible for scanning said first communication for computer viruses; and operating said first virus scanner to scan said second communication for computer viruses;

wherein said set of scanning rules comprises:

a first subset of scanning rules for determining when said communication may be scanned for target content by a destination node of said communication instead of the firewall; and a second subset of scanning rules for determining when said communication is to be scanned on said destination node and not on the firewall;

wherein negotiating between the firewall and said first node defines said first subset of said scanning rules.

5. The method of claim 4 wherein said negotiating comprises:
    establishing a secure connection between the firewall and said first node;
    receiving at the firewall a proposed set of criteria for determining when said first node shall scan a communication instead of the firewall; and
    determining whether said proposed set of criteria conflicts with said second subset of said scanning rules.

6. The method of claim 4, wherein said negotiating further comprises providing said first subset of said scanning rules to said first node.

7. The method of claim 4 wherein said negotiating further comprises sending an updated version of said second virus scanner to said first node.

8. The method of claim 4, wherein said negotiating is performed after said second virus scanner is configured on said first node by a user.

9. The method of claim 4, wherein said negotiating is performed after said first node is rebooted.

10. A method of protecting a network of computer nodes from computer viruses, wherein the network of computer nodes is connected to a firewall, comprising:
    maintaining a set of scanning rules for determining when a communication received at a firewall is to be scanned on the firewall and when said communication may be scanned by the destination node of said communication;
    receiving a first communication at the firewall, wherein said first communication is intended for a first computer node connected to the firewall;
    determining whether a first virus scanner is enabled on the firewall;
    determining whether a second virus scanner is enabled on said first computer node;
    identifying a first set of attributes of said first communication;
    determining from said first set of attributes and said rules that said first communication is to be scanned on said first computer node;
    forwarding said first communication to said first computer node without scanning said first communication for computer viruses, wherein said first computer node scans said first communication for computer viruses using said second virus scanner;
    receiving a second communication at the firewall;
    identifying a second set of attributes of said second communication;
    determining from said second set of attributes and said rules that the firewall is responsible for scanning said first communication for computer viruses; and
    operating said first virus scanner to scan said second communication for computer viruses;
    wherein said set of scanning rules comprises:
    a first subset of scanning rules for determining when said communication may be scanned for target content by a destination node of said communication instead of the firewall; and
    a second subset of scanning rules for determining when said communication is to be scanned on said destination node and not on the firewall;
    wherein said second subset of said scanning rules is received from a firewall administrator.

11. A computer readable storage medium storing instructions that, when executed by a computer, cause the computer to perform a method of scanning a communication received at a firewall for target content, wherein the communication is directed to one of a set of computer nodes connected to the firewall, the method comprising:
    maintaining on the firewall a scanning module configured to scan communications received at the firewall;
    maintaining a set of criteria for determining when one of said communications may be scanned at a computer node connected to the firewall instead of at the firewall;
    partitioning responsibility for scanning said communications between said firewall and a first computer node connected to the firewall;
    receiving a first communication at the firewall, wherein said first communication is intended for said first computer node;
    identifying one or more attributes of said first communication;
    determining from said criteria and said attributes whether to scan said first communication for target content on the firewall;
    determining from said criteria and said attributes whether said first computer node is configured to scan said first communication for said target content; and
    forwarding said first communication to said first computer node;
    wherein said first computer node receives and scans the communication for said target content;
    wherein said partitioning comprises:
    receiving scanning capabilities of a first computer node connected to the firewall;
    consulting a set of scanning requirements specified by an operator of the firewall; and
    specifying a set of criteria to identify when a communication may be scanned for target content by said first computer node.

* * * * *